US010279750B2

(12) United States Patent
Lambert

(10) Patent No.: US 10,279,750 B2
(45) Date of Patent: May 7, 2019

(54) TRUCK BED MOVABLE BUMPER DEVICE

(71) Applicant: Edwin Lambert, Panama City, FL (US)

(72) Inventor: Edwin Lambert, Panama City, FL (US)

( * ) Notice: Subject to any disclaimer, the term of this patent is extended or adjusted under 35 U.S.C. 154(b) by 0 days.

(21) Appl. No.: 15/234,389

(22) Filed: Aug. 11, 2016

(65) Prior Publication Data

US 2016/0347256 A1  Dec. 1, 2016

Related U.S. Application Data

(63) Continuation-in-part of application No. 14/561,986, filed on Dec. 5, 2014, now abandoned.

(60) Provisional application No. 61/912,105, filed on Dec. 5, 2013.

(51) Int. Cl.
*B60R 9/06* (2006.01)
*B60P 3/14* (2006.01)

(52) U.S. Cl.
CPC ........ *B60R 9/06* (2013.01); *B60P 3/14* (2013.01); *B60R 9/065* (2013.01)

(58) Field of Classification Search
CPC ................................. B60R 11/06; B60R 9/06
USPC ........................................................ 296/37.6
See application file for complete search history.

(56) References Cited

U.S. PATENT DOCUMENTS

| | | | | |
|---|---|---|---|---|
| 3,826,529 A * | 7/1974 | Wood | ...................... | B60R 11/06 296/183.1 |
| 5,037,153 A * | 8/1991 | Stark | ........................ | B60R 9/00 224/281 |
| 5,088,636 A * | 2/1992 | Barajas | .................... | B60R 11/06 224/281 |
| 6,460,744 B2 * | 10/2002 | Lance | ....................... | B60P 3/14 224/404 |
| 6,945,580 B1 * | 9/2005 | Hentes | ...................... | B60R 9/00 224/404 |
| 7,052,066 B2 * | 5/2006 | Emery | .................... | B60R 11/06 296/37.1 |
| 7,290,819 B2 * | 11/2007 | Howard | .................. | B60R 5/041 224/404 |
| 7,530,618 B2 * | 5/2009 | Collins | ................... | B60P 1/003 224/403 |
| 7,726,719 B1 * | 6/2010 | Barron | .................... | B60R 9/065 224/404 |
| 7,731,026 B2 * | 6/2010 | Harrison | .................. | B60P 3/14 206/349 |
| 8,776,778 B1 * | 7/2014 | Brown | .................... | B60R 11/00 126/276 |
| 2006/0102669 A1 * | 5/2006 | Fouts | ........................ | B60R 9/00 224/404 |

(Continued)

*Primary Examiner* — Hilary L Gutman

(57) ABSTRACT

A movable device mounted to the interior of a truck bed. The movable device is generally comprised of at least one housing unit, a track mounting system and at least two tracks. The housing unit is capable of traversing from the front end of the truck bed (proximate the cab of the truck) to the rear end of the truck bed (proximate the tailgate). The current invention includes tracks mounted to the bottom surface of a truck bed. The housing unit of the invention is mounted to those tracks by a track mounting system. By translating the housing unit towards the rear end of the truck, the device is capable of forcing contents contained within the truck bed towards the rear end of the truck.

19 Claims, 18 Drawing Sheets

(56) References Cited

U.S. PATENT DOCUMENTS

2018/0118077 A1\* 5/2018 Ferkul ................... B60P 1/003
2018/0340356 A1\* 11/2018 Brennan ............. E05B 73/0023

\* cited by examiner

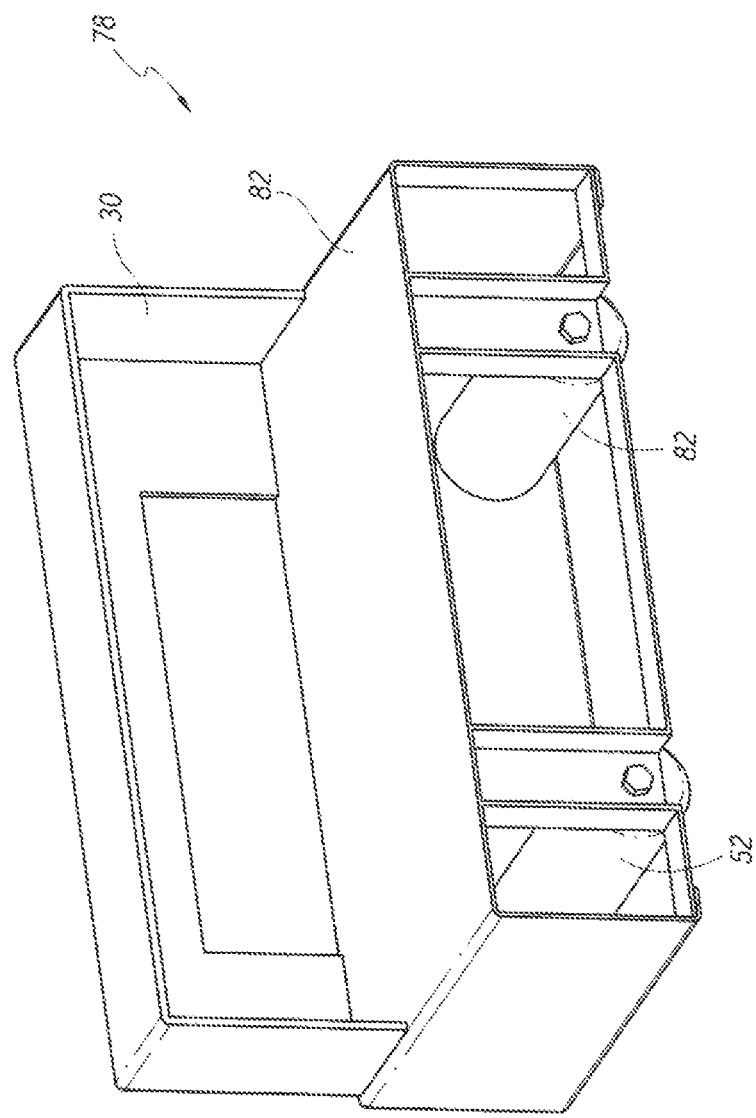

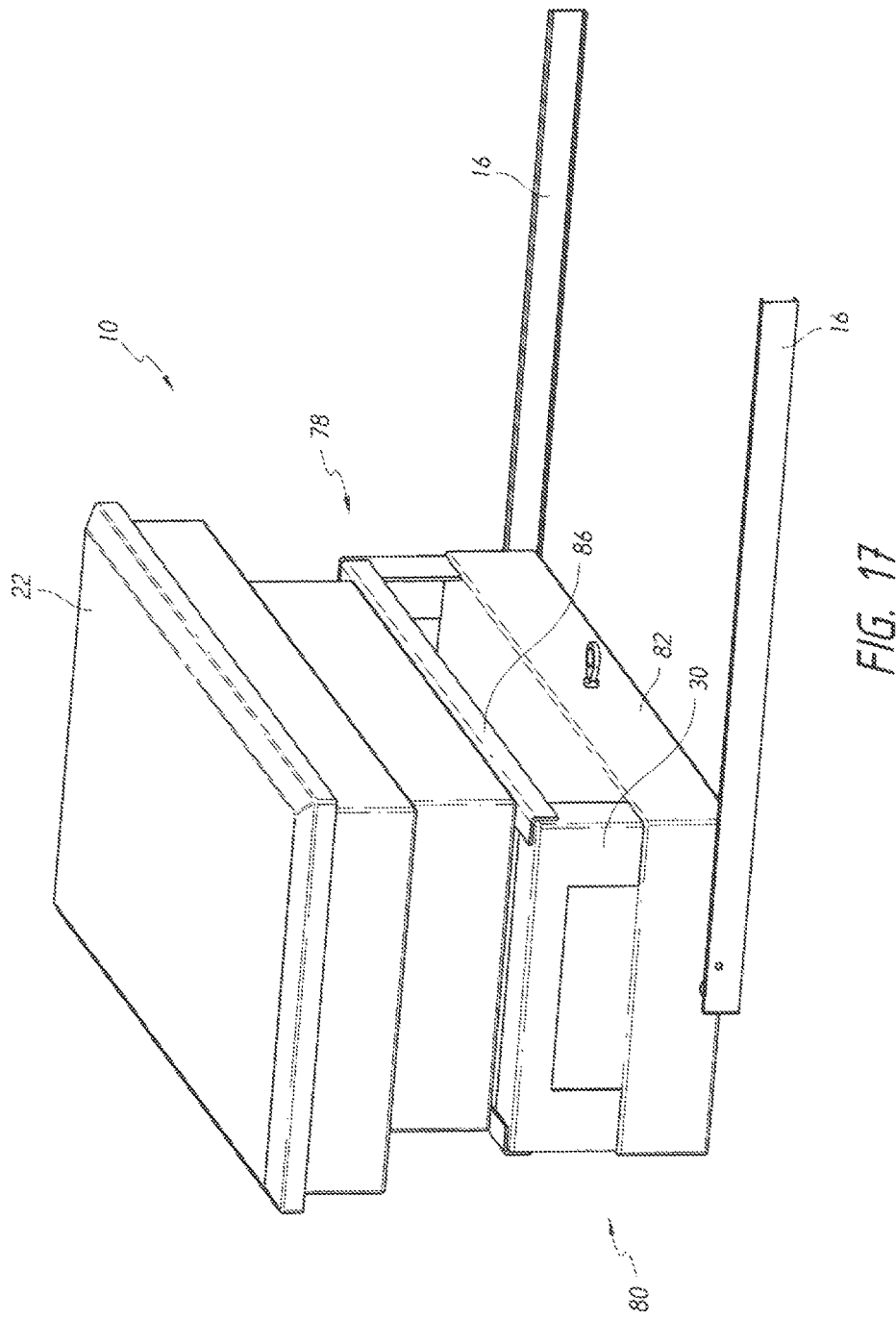

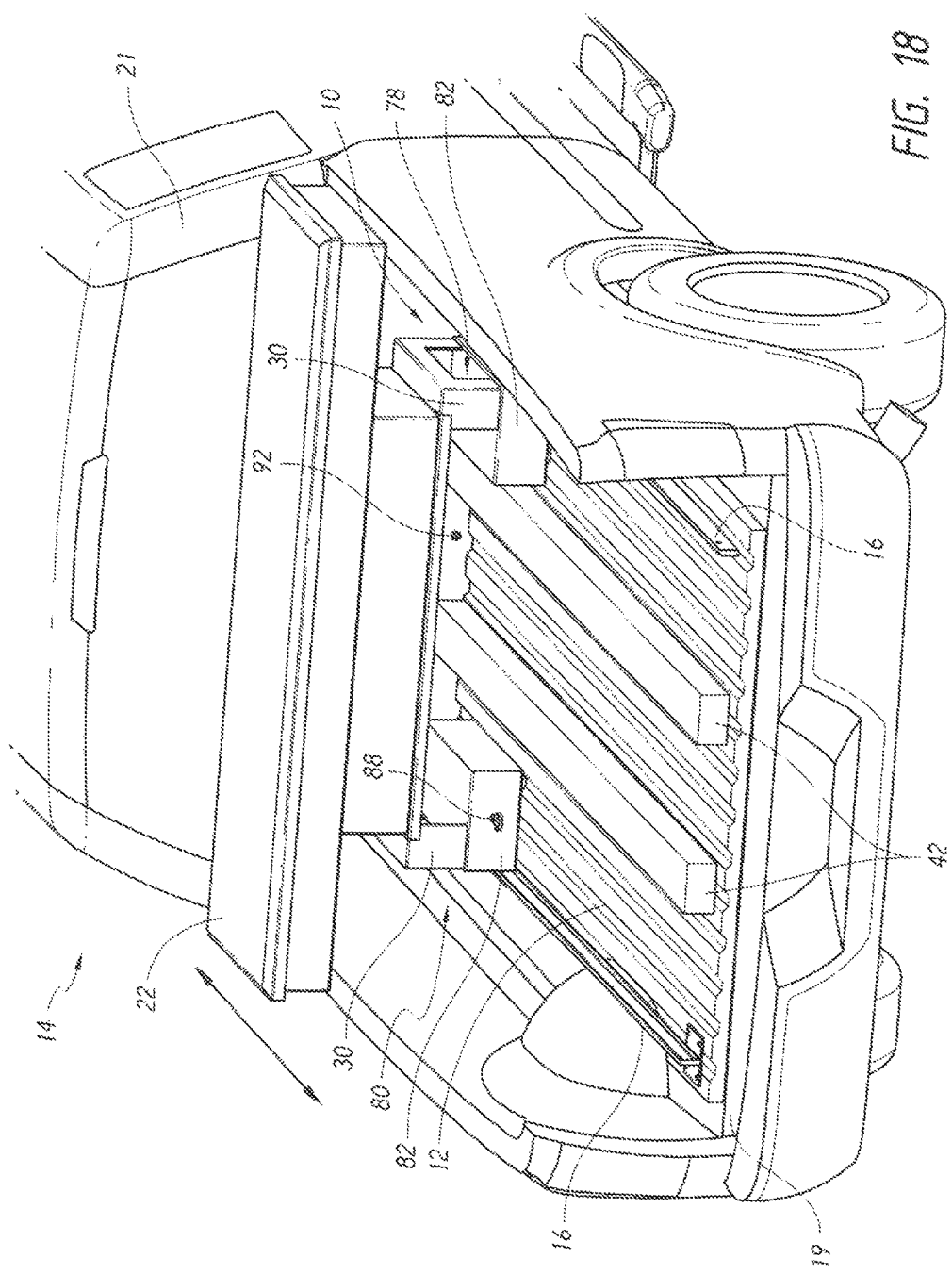

TRUCK BED MOVABLE BUMPER DEVICE

CROSS-REFERENCES TO RELATED APPLICATIONS

Pursuant to the provisions of 37 C.F.R. § 1.53(c), this non-provisional patent application claims the benefit of an earlier-filed non-provisional patent application (U.S. Ser. No. 14/561,986, filed Dec. 5, 2014), which claims the benefit of a provisional patent application (U.S. Ser. No. 61/912,105, filed Dec. 5, 2013). Both applications list the same inventor.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of truck beds. More specifically, the invention comprises movable device attached to the bed of a truck.

2. Description of the Related Art

Many trucks are furnished with mounting systems for toolboxes or other items. In the case of a pick-up truck, those toolboxes are typically securely fastened to the bed of the truck, near the cab of the truck. Generally, the toolbox is contained within the bed of a truck and either mounted to the inside of the bed or the top edge of the bed of the truck. While the purpose of requiring tools in a user's vehicle varies, the need for tools on a work truck or other vehicle is commonly known.

A few reasons for including tools within one's vehicle are illustrated by the following. First, a toolbox (and the tools contained within the toolbox) is often required for a user's occupation. For example, a construction contractor requires tools while working on a job site. Second, many self-employed individuals or small companies require the use of tools—such as a plumber, A/C technician, etc., but often have a single work truck. Finally, many truck owners own a truck for the inherent utility accompanied with owning a truck. From this perspective, many truck owners use the truck for jobs or activities that require either tools or other outdoor gear that requires storage.

While many trucks include a mounting system for a toolbox attached to the bed of the truck, there are some drawbacks associated with that configuration due to the ideal location of the toolbox. In order to use the bed of a pick-up truck for something other than storing tools, a toolbox is often placed proximate the cab of the truck. This leaves the rest of the truck bed open for any other uses. Oftentimes, this causes the space in the center of a toolbox to be wasted. The wastefulness stems from the lack of access created by the height of the truck and the width of the truck bed. If the user reaches into the toolbox from the side of the truck, standing on the ground, he or she will typically have an issue reaching the center of the toolbox. These factors make it difficult for a user to reach the center the toolbox—causing the user to refrain from using the center or to find another approach to obtain his or her tools. Obviously, the user can climb into the bed of the truck in order to reach the center of the toolbox. However, this is difficult for user's who are older or slightly disabled (where stepping up into a truck bed is not easily accomplished or even possible).

The difficulty of stepping up into the bed of a truck does not end with obtaining tools from a toolbox. Many truck owners use the bed of the truck to haul large and/or heavy objects such as furniture, bags of mulch, bags of concrete, stones, etc. However, once the objects are loaded, it may be difficult to remove the objects for any number of reasons. For example, if large heavy objects were purchased from a home improvement store, typically, the store clerk assists the customer in the loading of said objects. Unfortunately, when the customer arrives home to unload the goods, they may not have anyone to assist them. Also, unloading is typically more difficult than loading since many objects can be tossed into the truck bed (bags of mulch and concrete). However, in order to unload those objects the owner is required to step up into the truck bed.

Therefore, what is needed is a mounting device that allows users to unload the bed of a truck and access the full capacity of any object mounted on the device. Of course, inventors have tried to achieve some of these goals. However, they fail to provide storage for a container other than a tool box. The present invention achieves this objective, as well as others that are explained in the following description.

BRIEF SUMMARY OF THE INVENTION

The present invention comprises a movable device connected to the interior of a truck bed. In one embodiment of the present invention, the movable device includes at least one linear track and at least one housing unit (referred to as a bumper in the related applications). The reader will appreciate that the housing unit acts as a bumper, or shock absorber, when pushing objects in the track backwards to the rear end of the track, as explained herein. The housing unit is capable of sliding from the front end of the truck bed (proximate the cab of the truck) to the rear end of the truck bed (proximate the tailgate) along the track or tracks. The tracks are mounted within the truck bed. The tracks can be mounted to any surface within the bed of the truck, whereby the housing unit is allowed to linearly translate from the front of the truck to the rear of the truck within the bed of the truck. One such example is to mount the tracks to the bottom surface of a truck bed. The housing unit is then attached to the tracks in such a way that does not allow for vertical translation.

Preferably, an object or device of the user's choice is then mounted to the housing unit. This could be any number of objects, including a toolbox, cooler, bicycle rack, portable Bar-B-Que grill, or other object. The present invention preferably includes brackets in order to mount such an object to the housing unit. In addition, the present invention can be used to traverse objects resting in the bed of the truck. By translating the housing unit towards the rear end of the truck, the device contacts and forces contents contained within the truck bed towards the rear end of the truck, thereby allowing the user to gather the items without entering the bed of the truck.

BRIEF DESCRIPTION OF THE SEVERAL VIEWS OF THE DRAWINGS

FIG. 16 is a perspective view, showing first housing unit of the present invention.

FIG. 17 is a perspective view, showing an object mounted to the present invention.

FIG. 18 is a perspective view, showing the present invention in a truck bed.

Figure 1:
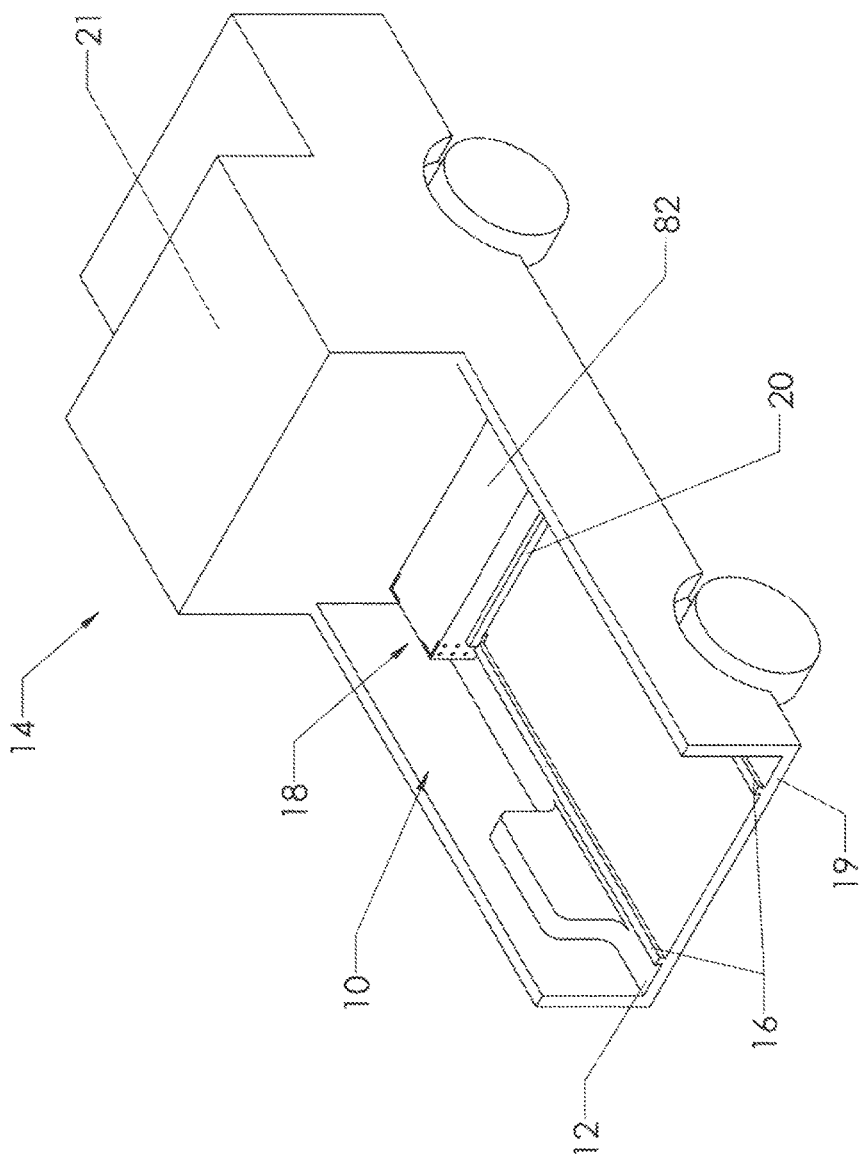
FIG. 1 is a perspective view, showing an embodiment of the present invention attached to a pick-up truck.

REFERENCE NUMERALS IN THE DRAWINGS 10 movable device
12 truck bed
14 truck
16 tracks
18 housing unit
19 rear end of truck
20 guard
21 cab of truck
22 object
24 groove
25 track mounting system
26 locking mechanism
28 wheel well
30 corner bracket
31 truck bed side wall
32 bolt
34 motor
36 output shaft
38 coupler
40 translation mat
42 item
44 cool storage container
46 strap fastener
48 strap
50 "C" track
52 roller
54 bolt holes
56 bracket slot
58 lead screw
60 nut
62 slider
64 rack
66 catch
68 hook
70 gear
72 axle
74 pinion
76 stationary bearing
78 first housing unit
80 second housing unit
82 main body
84 upper member
86 cross member
88 grip (coupler?, loop, eyelet)
90 pull/hook
92 void
94 pinion thing?
96 outer rollers
98 belt

DETAILED DESCRIPTION OF THE INVENTION

The present invention provides a movable device that allows a user to translate a receptacle or other object from the front end of a truck bed (proximate the cab of the truck) to the rear end of a truck bed (proximate the tailgate of the truck). In addition, the present invention allows a user to contact and force objects within the bed of at truck towards the rear of the truck. FIG. 1 shows one embodiment of the current invention. Movable device 10 is contained within truck bed 12 in truck 14. Preferably, movable device 10 includes tracks 16, housing unit 18, track mounting system 25 (not visible in current view) and guard 20. At least one track 16 is mounted to truck bed 12. The mounting method of track 16 can be any method known in the prior art, including bolting track 16 to truck bed 12. In a preferred embodiment, tracks 16 are mounted to the bottom surface of truck bed 12. In the alternative, tracks 16 can be fully integrated with truck bed 12 or welded to truck bed 12. The engagement of housing unit 18 via track mounting system 25 with tracks 16 varies based on the configuration used to translate housing unit 18 along tracks 16. The different configurations used to translate housing unit 18 are discussed below. Preferably, housing unit 18 is capable of linearly translating along tracks 16 towards the rear end 19 of truck 14 and back towards the cab 21 of truck 14. Housing unit 18 preferably includes main body 82, upper members 30 (shown in FIGS. 2 and 4), guard 20 and motor 34 (not visible in the current view).

Figure 2:
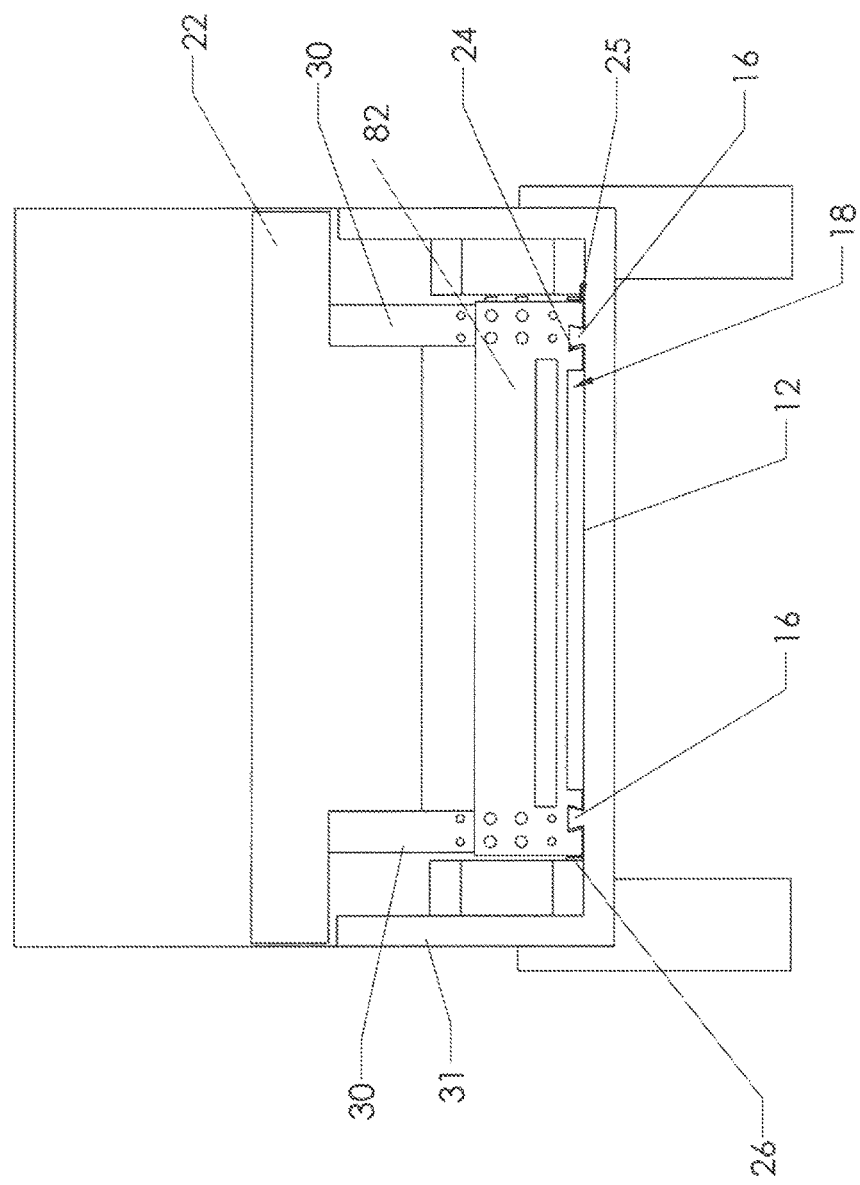
FIG. 2 is an elevation view, showing the embodiment of the FIG. 1.

FIG. 2 shows an elevation view of object 22 mounted to movable device 10. Preferably, housing unit 18 is designed to accommodate a variety of objects 22. Some examples of objects 22 that may be mounted to housing unit 18 are a cool storage container, a bicycle rack for securing bicycles, a toolbox or similar receptacle, a grilling assembly, a tackle box for fishing gear, or camping gear/packs. There are multiple methods of fastening the described objects 22 to housing unit 18. Of course, these techniques vary for most of the objects 22. Thus, each fastening method will accompany the multiple object descriptions.

Also, the figure illustrates an embodiment of the present invention wherein the housing unit 18 translates manually along tracks 16 (without mechanical assistance from a motor or other driving device). A handle may be provided to physically translate housing unit 18, thereby allowing a user to push or pull housing unit 18 along tracks 16. This view of truck bed 12 shows the shape of track 16 and the corresponding shape of groove 24. In this embodiment track 16 has a "dovetail" profile. In addition, a groove 24 is included on the track mounting system 25. Preferably, track mounting system 25 is attached to housing unit 18. Track mounting system 25 then mounts to track 16—the method of mounting is dependent upon the type of track 16. In each embodiment, movable device 10 includes a track mounting system 25 attached to the underside of housing unit 18, which mounts to tracks 16, allowing housing unit 18 to move linearly along tracks 16. Of course, as the tracks 16 vary, so does the track mounting system 25. This will be made clear in the subsequent text. Referring back to FIG. 2, the "dovetail" profile allows housing unit 18 to translate effortlessly along track 16 while preventing translation in both perpendicular directions—upward and lateral. In other words, the profile of track 16 and groove 24 allow for linear motion. Preferably, track 16 and track mounting system 25, (including groove 24) can be any slider/bearing system known in the prior art, such as nylon (or other smooth plastic) bearing and track, roller bearing and track, or a ball bearing assembly. However, any known track mounting system can be used.

Figure 3:
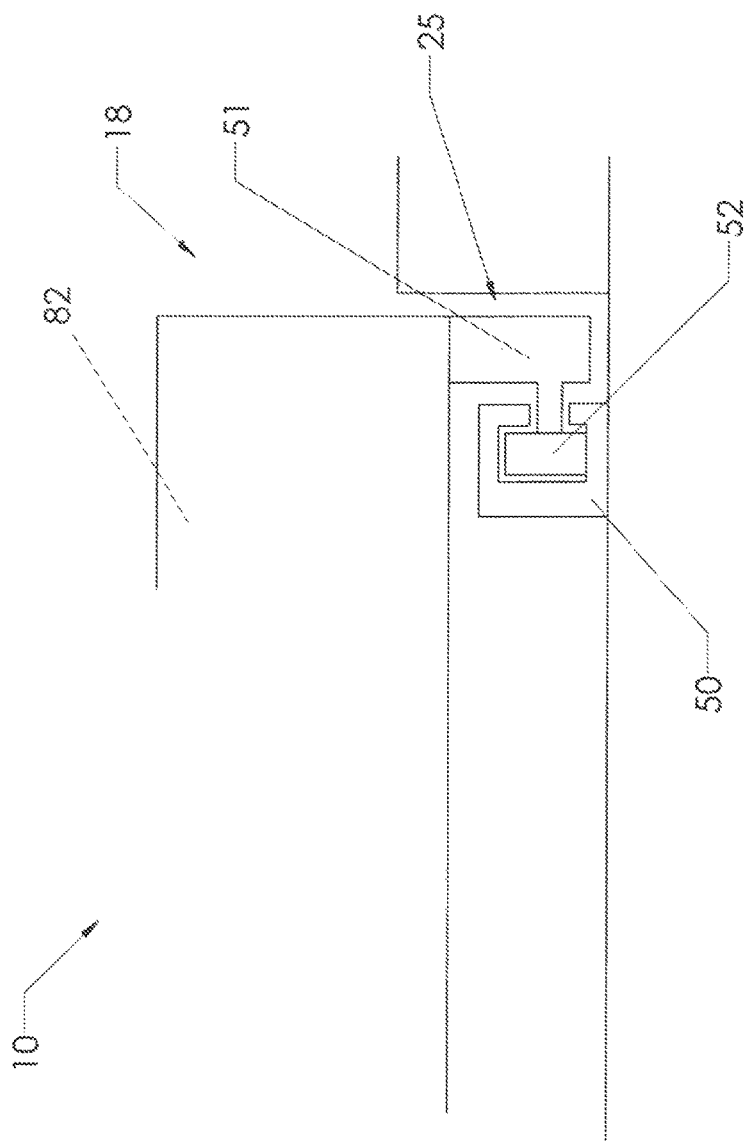
FIG. 3 is an elevation view, showing, an embodiment of the present invention which translates using rollers.

FIG. 3 shows a detailed drawing of another embodiment of the manually movable configuration of movable device 10. In this particular embodiment of the present invention, the track is a "C" track 50 and track mounting system 25 includes connecting member 51 and roller 52. As discussed in the preceding text, there are a number of techniques that can be incorporated in order to manually move housing unit 18 from the rear to the front of truck bed 12. FIGS. 2-3 simply demonstrate two possible configurations.

The reader will note that the embodiments illustrated in FIGS. 2-3 are designed in such a way that each track/slider combination is inherently restricted to one dimension of motion. The "dovetail" configuration restricts the slider based on the geometry of the slider and track. The roller and "C" track configuration allows the roller to roll in one direction while the track prevents upward and lateral movement of the roller, thereby preventing lateral and upward motion of the housing unit 18. Those familiar with the art will realize that these are both common techniques that allow the user to limit motion to a single direction. Thus, the reader should not limit the scope of the present invention to one of these techniques, but rather to the general method of translation.

A preferred embodiment of the present invention also contains locking mechanism 26. Preferably, at least one locking mechanism 26 is used for each track 16 and track mounting system 25 combination. Once housing unit 18 is translated to the desired position, the user can tighten or clamp down (depending on the mechanism used for locking mechanism 26) housing unit 18. Although a threaded hole/screw type mechanism is shown, the present invention should not be limited to such a method for preventing housing unit 18 from translating. Thus, locking mechanism 26 can be any tightening/clamping method known in the art, such as a lever clamp or a position automated snap lock. Preferably, locking mechanism 26 allows the user to lock housing unit 18 to tracks 16, thereby preventing movement along tracks 16. Thus, the user can engage and disengage the locking mechanism 26 as he or she wishes to move housing unit 18 for the manual sliding configuration of movable device 10.

In addition to a manual track mechanism, FIG. 2 shows a preferred method for fastening object 22 to main body 82 of housing unit 18. Preferably, upper member 30 (referred to as corner brackets in related applications) fastens to main body 82 and object 22. As illustrated, upper members 30 raise object 22 to a height such that object 22 does not collide with truck bed side wall 31. A typical truck bed toolbox is designed to be fastened against the upward facing surface of truck bed side wall 31. Thus, brackets 30 allow the user to adjust the height of object 22 in order to avoid collision of object 22 with truck bed side wall 31. Another important feature illustrated in the figure is the necessity to account for wheel well 28. Housing unit 18 must be capable of sliding to the rear of truck bed 12 without interference with wheel well 28. The reader will also note that object 22 does not cause any interference with wheel well 28.

Figure 4:
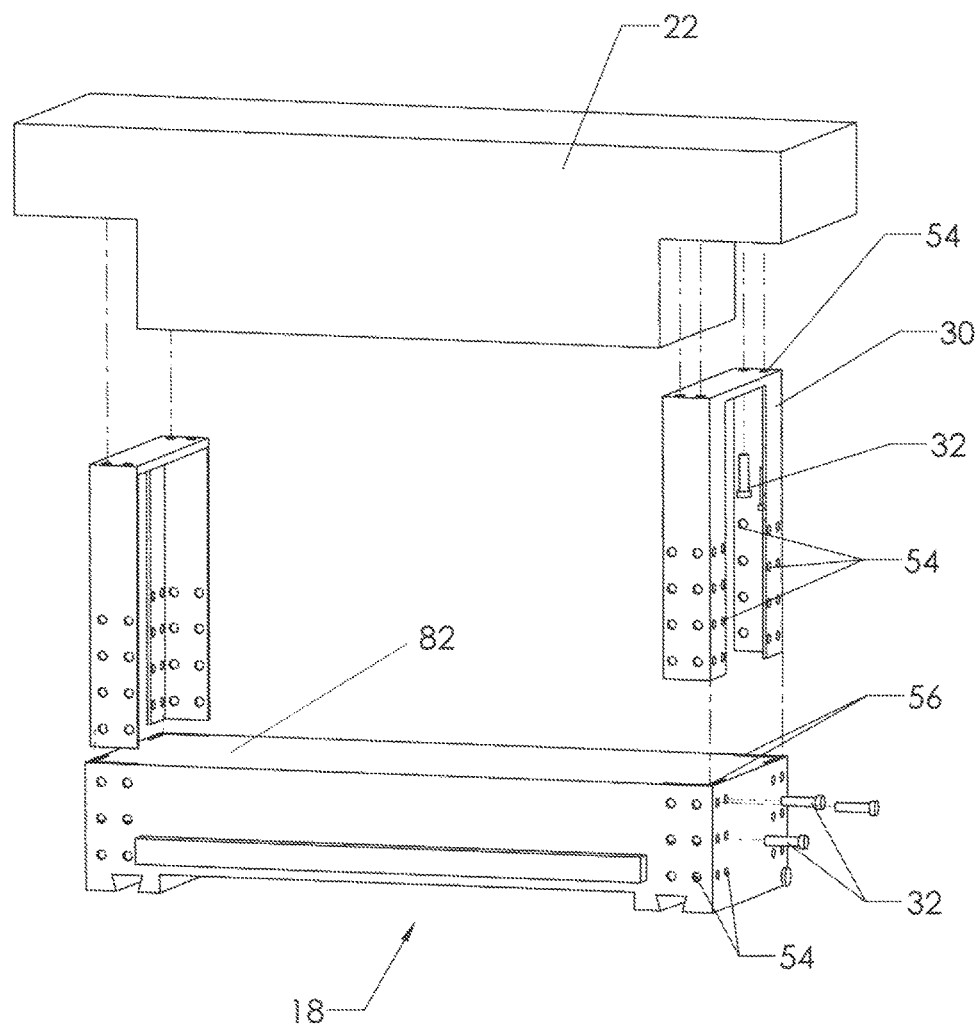
FIG. 4 is an exploded view, showing the assembly of the brackets and device housing unit.

FIG. 4 shows an exploded view of object 22, bumper device 18, and upper members 30. In this particular embodiment, object 22 is a toolbox intended to be mounted in a truck bed. As illustrated, main body 82 of housing unit 18 preferably includes bolt holes 54 and bracket slots 56. Preferably, bracket 30 includes bolt holes 54 on the vertical surfaces and horizontal surface, as illustrated. The bolt holes 54 on the vertical surface of bracket 30 align with the bolt holes 54 on main body 82. Once these are aligned and adjusted to the correct height, bolts 32 can be inserted into bolt holes 54 in order to attach upper members 30 to main body 82. Preferably, bolts 32 are inserted into the bolt holes 54 on the horizontal surface of upper members 30 and into the underside of object 22 as shown. Those familiar with the art will realize that a truck bed toolbox is typically fastened to truck bed side wall 31 in a similar fashion. In addition, the reader should not limit the present invention to this mounting technique. There are a multiple methods of mounted object 22 to either upper members 30 or directly to main body 82 of housing unit 18.

Figure 5:
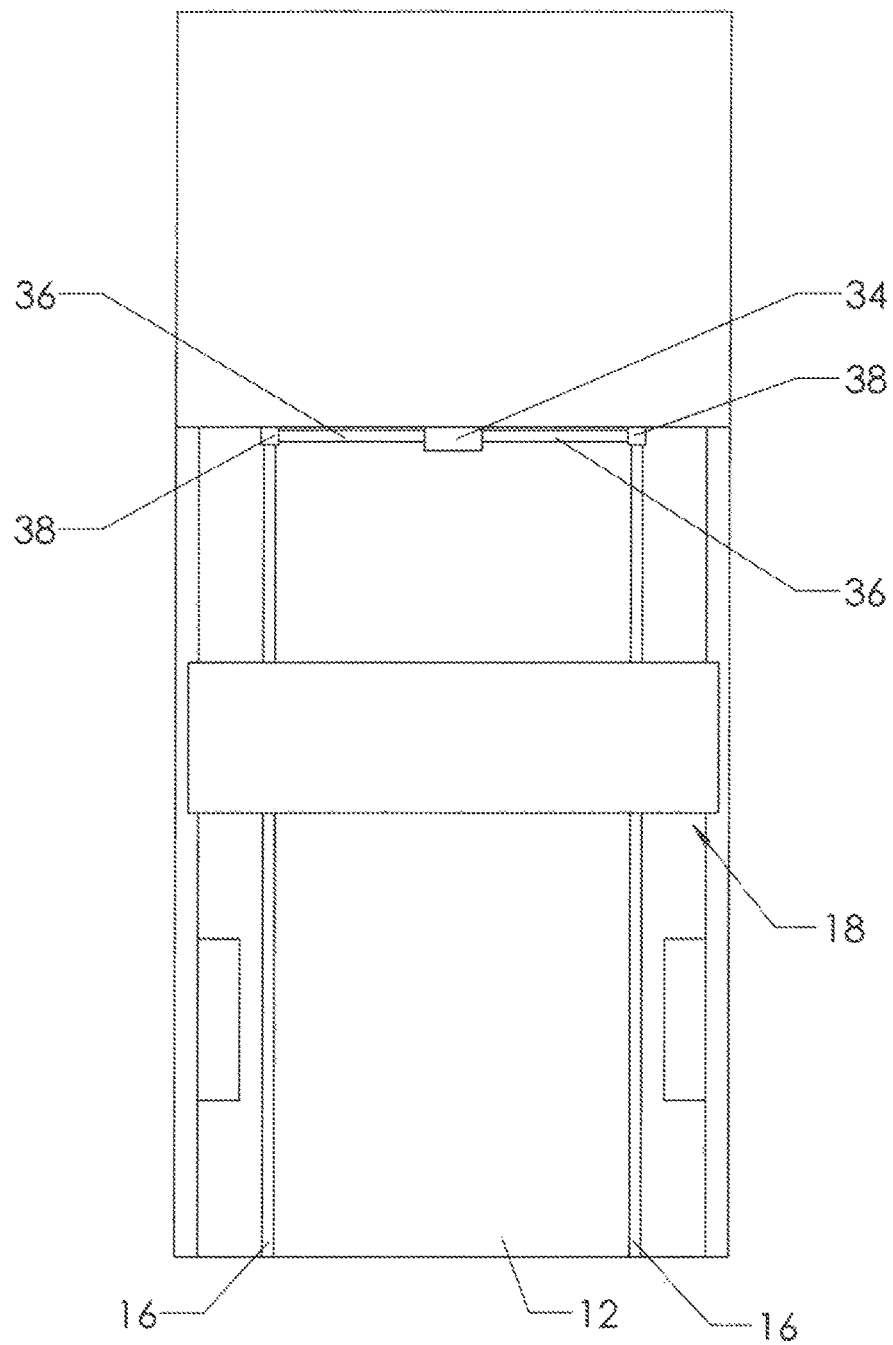
FIG. 5 is a plan view, showing an embodiment of the present invention which translates using a lead screw and nut.

FIG. 5 shows another embodiment of the current invention. Movable device 10 is motorized in this embodiment of the invention. In the present embodiment, motor 34 is fastened to truck bed 12. However, motor 34 can also be located within main body 82. In this embodiment of the present invention, motor 34 includes two output shafts 36, as shown. Each output shaft 36 is connected to coupler 38 which translates the motion of motor 34 to track 16. There are multiple possible configurations that can be used to translate housing unit 18 using motor 34. One such configuration is a lead screw assembly. In this case, motor 34 and therefore output shaft 36 are attached to a lead screw that spans the length of truck bed 12. The lead screw may act as track 16 or in accordance with track 16. Although the current view shows the present invention with a single motor configuration, the reader should note that many other embodiments are possible. For example, instead of a single motor with two couplers, two synchronized motors in the place of couplers 38 could be used with the same result. In addition, a driving device other than a motor can be used in order to traverse bumper device 18.

Those skilled in the art will be familiar with the mechanics of a lead screw assembly. Briefly, a stationary nut is attached to the underside of bumper device 18—approximately in the location of groove 24 in FIG. 2. The lead screw is threaded through the nut. Motor 34 rotates each lead screw through coupler 38 (or the ball screw directly in the dual motor configuration), the nut translates linearly, thereby translating housing unit 18.

Figure 6:
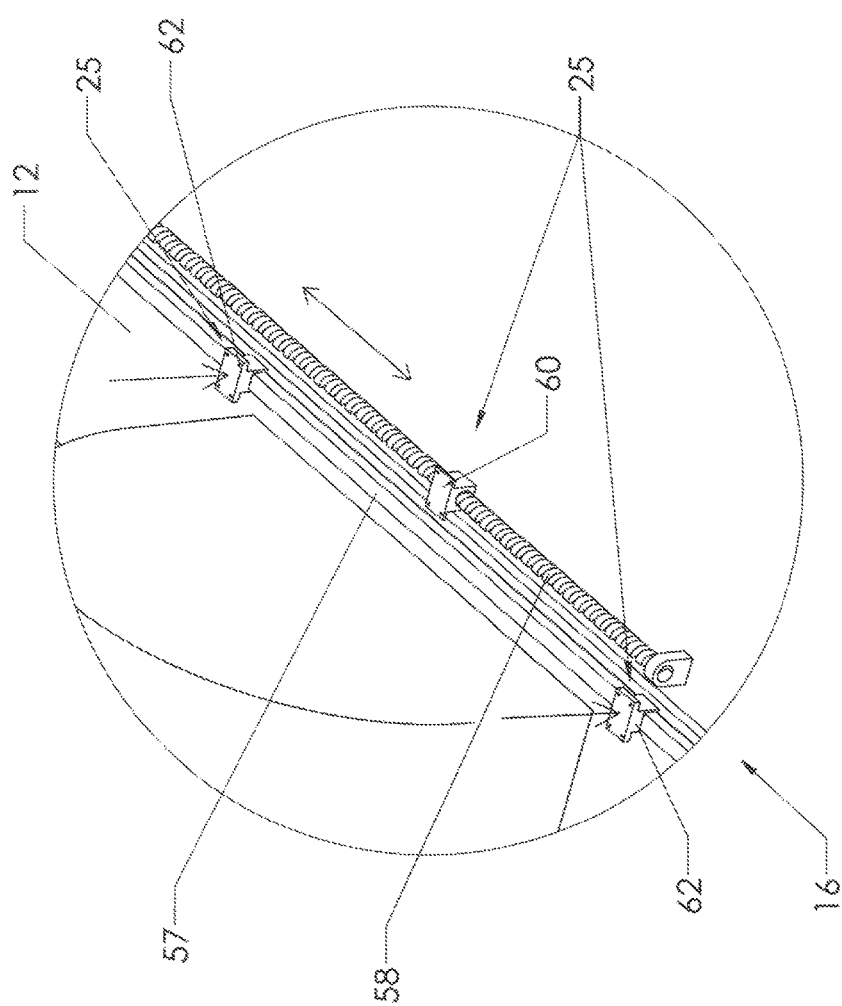
FIG. 6 is a detailed perspective view, showing a screw drive in conjunction with a slider track.

In some instances, the lead screw 58 acts as track 16, wherein the only vertical support for bumper device 18 is the lead screw 58. In another embodiment, lead screw 58 is coupled with another rail to create track 16. This is illustrated in FIG. 6. The reader will note that housing unit 18 has been removed from FIG. 6 in order to clearly illustrate track 16 and track mounting system 25. In this embodiment, track 16 includes both rail 57 and lead screw 58. Preferably, rail 57 has a rectangular profile with a groove on either side. Lead screw 58 is preferably mounted to truck bed 12 using stationary bearings 76. In this embodiment, track mounting system includes slider 62 and nut 60. The profile of slider 62, in this embodiment, is generally rectangular with two tabs that fit into the grooves located on rail 57. This is a common slider and rail alignment that allows for strictly linear motion. In this embodiment, lead screw 58 preferably translates bumper device 18 along the length truck bed 12. This is indicated by the double-headed arrow. As part of track mounting system 25 nut 60 and slider 62 are attached to main body 82 (although main body 82 is not shown in the present figure). Thus, as motor 34 (not shown) rotates lead screw 58, nut 60 travels along lead screw 58. While lead screw 58 and nut 60 are translating housing unit 18, the weight of housing unit 18 and object 22 (not shown in this view) are supported by sliders 62 and rail 57. Those familiar with the art will realize that removing the vertical force from nut 60 (and therefore lead screw 58) reduces the necessary diameter for lead screw 58. Of course, reducing the diameter of lead screw 58 reduces the cost and weight of movable device 10.

Figure 7:
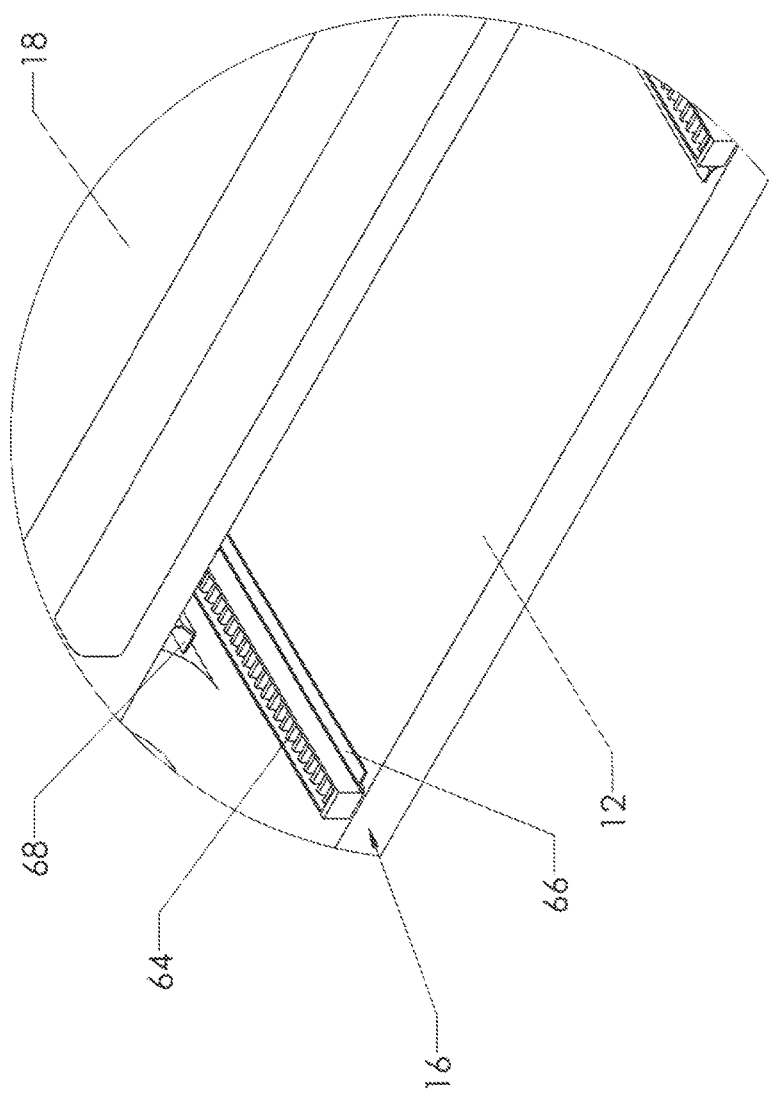
FIG. 7 is a detailed perspective view, showing an embodiment of the present invention which translates using a rack and pinion.
Figure 8:
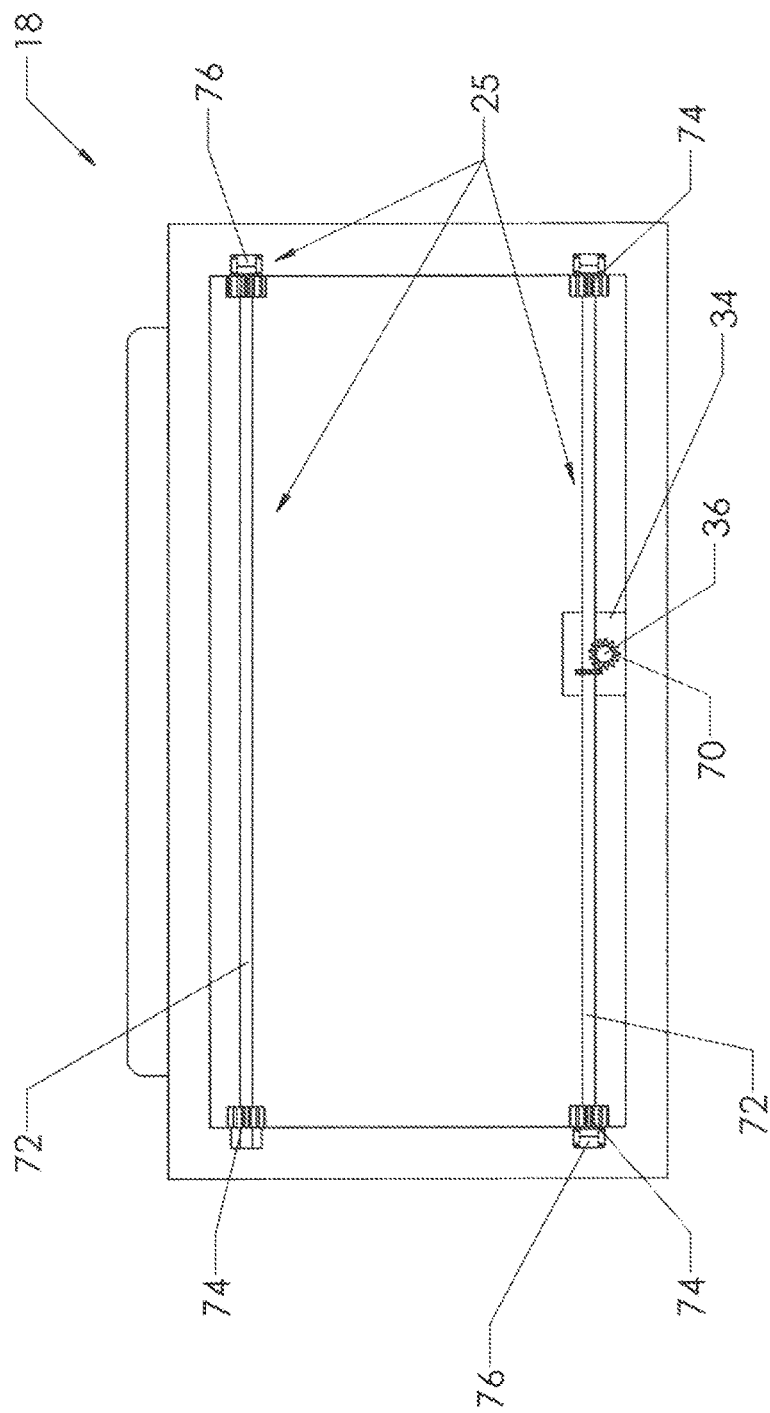
FIG. 8 is an elevation view, showing the device housing unit of the embodiment of FIG. 7.

Housing unit 18 can take on many forms of locomotion. Another such from is shown in FIG. 7. FIGS. 7-8 show a rack and pinion configuration. In this embodiment, rack 64 is fastened to truck bed 12. Preferably, catch 66 is attached to rack 64, which combine to form track 16. Preferably, catch 66 interlocks with hook 68 in order to prevent housing unit 18 from moving in the upward direction. Although catch 66 and hook 68 are interlocked, housing unit 18 is still free to slide along track 16.

FIG. 8 shows the bottom view of a preferred embodiment of housing unit 18. In this embodiment, motor 34 is attached to the inside of main body 82 of housing unit 18. The reader will note that main body 82 is shelled (having an open bottom), which allows space within main body 82. In this particular embodiment, track mounting system 25 includes axles 72, pinions 74, and stationary bearings 76. Tracks 16 are not shown in order to clearly see track mounting system 25. However, the reader will note that tracks 16 mate with pinions 74 in this particular embodiment. Preferably, gear 70 is connected to output shaft 36 of motor 34. Gear 70 is mated with axle 72. As illustrated, a pinion 74 is preferably mounted to each end of axle 72. Preferably, axles 72 are fastened to main body 82 by means of stationary bearings 76. Stationary bearings 76 allow axle 72 to rotate while keeping each axle 72 affixed to main body 82 of housing unit 18. By mounting motor 34 within main body 82, this embodiment of movable device 10 creates a design that optimizes space within truck bed 12. More specifically, tracks 16 (not shown in this figure) are more compact and there is only a wire (no motor or couplings) left behind when housing unit 18 translates to the rear of truck bed 12.

Those familiar with the art will realize that there are many methods that may be used to translate housing unit 18. In addition to those discussed, a chain and sprocket method, a belt drive (illustrated and described below), and many other known methods of linear motion can be used to traverse housing unit 18 along tracks 16. Thus, the reader should not limit the scope of the invention to those described.

Preferably, the motorized embodiment of the current invention is activated via remote control. Remote sensor technology is known in the prior art. The convenience of a remotely controlled motor is only increased with the small cost associated with such technology. While the preferred embodiment is controlled remotely, there are other possible embodiments—such as a switch located in cab or bed of the truck.

Figure 9:
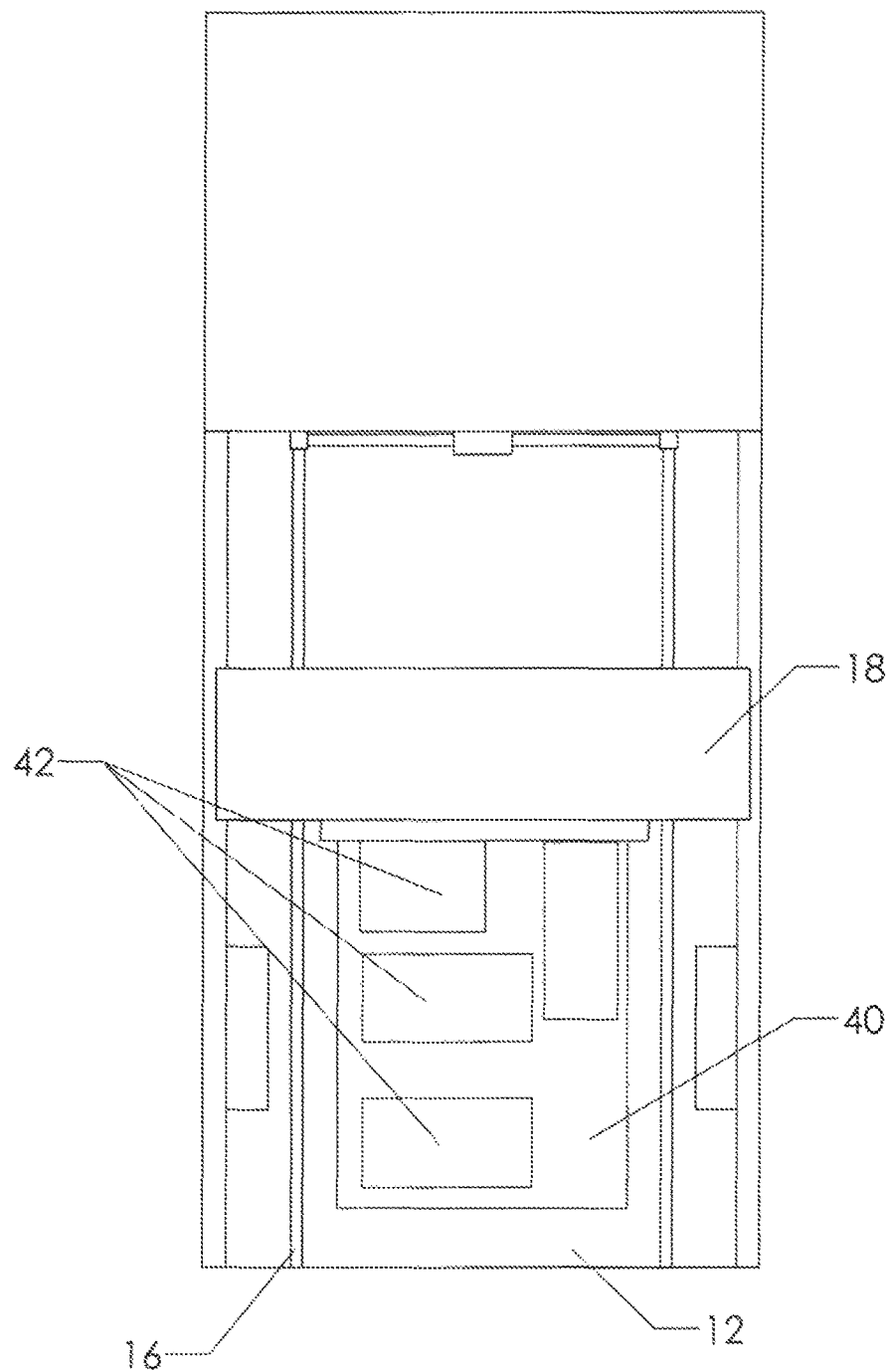
FIG. 9 is a plan view, showing an additional application of the present invention.

FIG. 9 shows the embodiment illustrated in FIG. 5 utilizing an additional application. Preferably, translation mat 40 is attached to housing unit 18. By loading translation mat 40 with items 42, the user can force items 42 to the rear of truck bed 12. Items 42 may be any object that a user may purchase or haul, such as bags of mulch, bags of concrete, or any other object—including very heavy items. Once items 42 are loaded upon translation mat 40 the user can easily translate items 42 to the rear of truck bed 12. Thus, the user avoids stepping up into truck bed 12 in order to unload the contents of truck bed 12. By forcing items 42 to the tailgate of the truck, the items 42 are much less difficult to unload for the user. Movable device 10 enables the user to remain outside of truck bed 12 while still having access to the contents of truck bed 12.

Preferably, translation mat 40 includes rollers connected to the under surface—allowing roller mat 40 to translate in the direction of motion of housing unit 18 more easily. However, the present invention should not be limited to rollers. Translation mat 40 may have wheels mounted to the underside surface instead of rollers. Another possible configuration of translation mat 40 is to be mounted to tracks 16. Translation mat 40 is preferably (at least) semi-rigid in order to support the weight of items 42. In addition, items 42 can be forced without the assistance of translation mat 40. Housing unit 18 may just push items 42 along truck bed 12.

Preferably, guard 20 is attached to main body 82 of housing unit 18. Bumper guard 20 is preferably fabricated using a hard rubber material. In the present invention, bumper guard 20 acts as a cushioning mechanism between items 42 and bumper device 18. In the event that items 42 are very rigid objects, such as stone or brick, guard 20 protects housing unit 18.

Figure 10:
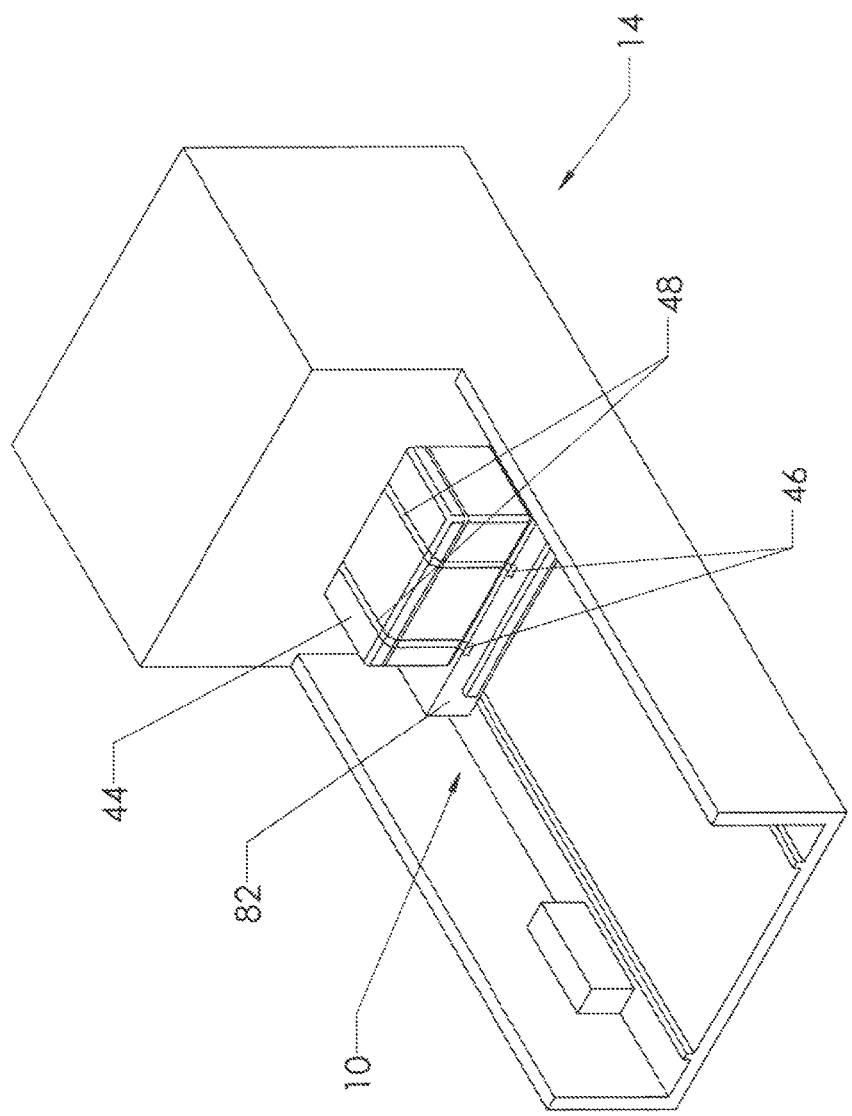
FIG. 10 is a perspective view, showing a cool storage container mounted to the present invention.

FIG. 10 shows a cool storage container 44 attached to housing unit 18. Preferably, cool storage container 44 is fastened to may body 82 of housing unit 18 by means of straps 48. Strap fasteners 46 are preferably attached to the front face of housing unit 18. Straps 48 prevent movement of cool storage container 44 while truck 14 is in motion. The reader should note that many objects can replace cool storage container 44. For example, a tackle box, camping gear, and many other containers, packs, racks or boxes can be attached to housing unit 18.

In some embodiments of movable device 10, the invention may be included with a truck upon purchase from the factory. This configuration creates a few advantages. First, tracks 16 are integral, and therefore more streamlined, to truck bed 12. Second, motor 34 could be mounted beneath truck bed 12, or in another unobtrusive location. Finally, while not much of an issue, the electrical connections would be wired with the rest of the vehicle.

A preferred embodiment of the present invention includes a locking mechanism. A manual locking mechanism for the manually movable truck bed device was discussed in the preceding text. In addition to a manual locking mechanism, the motorized movable device preferably includes limit switches. Those familiar with the art will know that limit switches can be set up near the front and rear of the truck bed in order to prevent the housing unit from traveling beyond a certain point. The limit switches may or may not act in accordance with a pre-programmed motor as a safety precaution, wherein the motor is programmed to have specified bounds.

In some embodiments of movable device, the motor is supplied power from the battery of the truck. In other embodiments, the invention is powered by an additional battery. Furthermore, embodiments of the present invention that include a separate battery may connect to magnetic contacts that allow that batter to recharge when the truck is running. These contacts would run to the alternator, thereby charging the extra battery in the same manner as the original truck battery.

Figure 11:
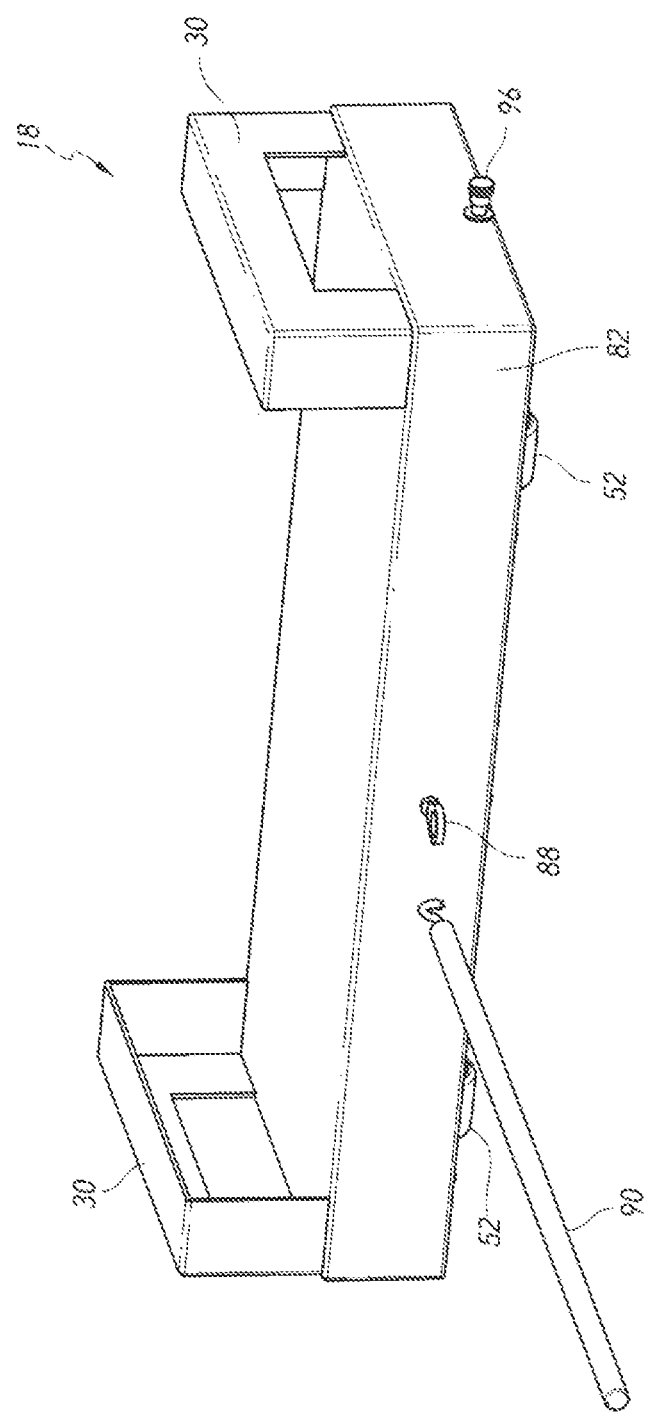
FIG. 11 is a perspective view, showing one embodiment of the present invention.
Figure 12:
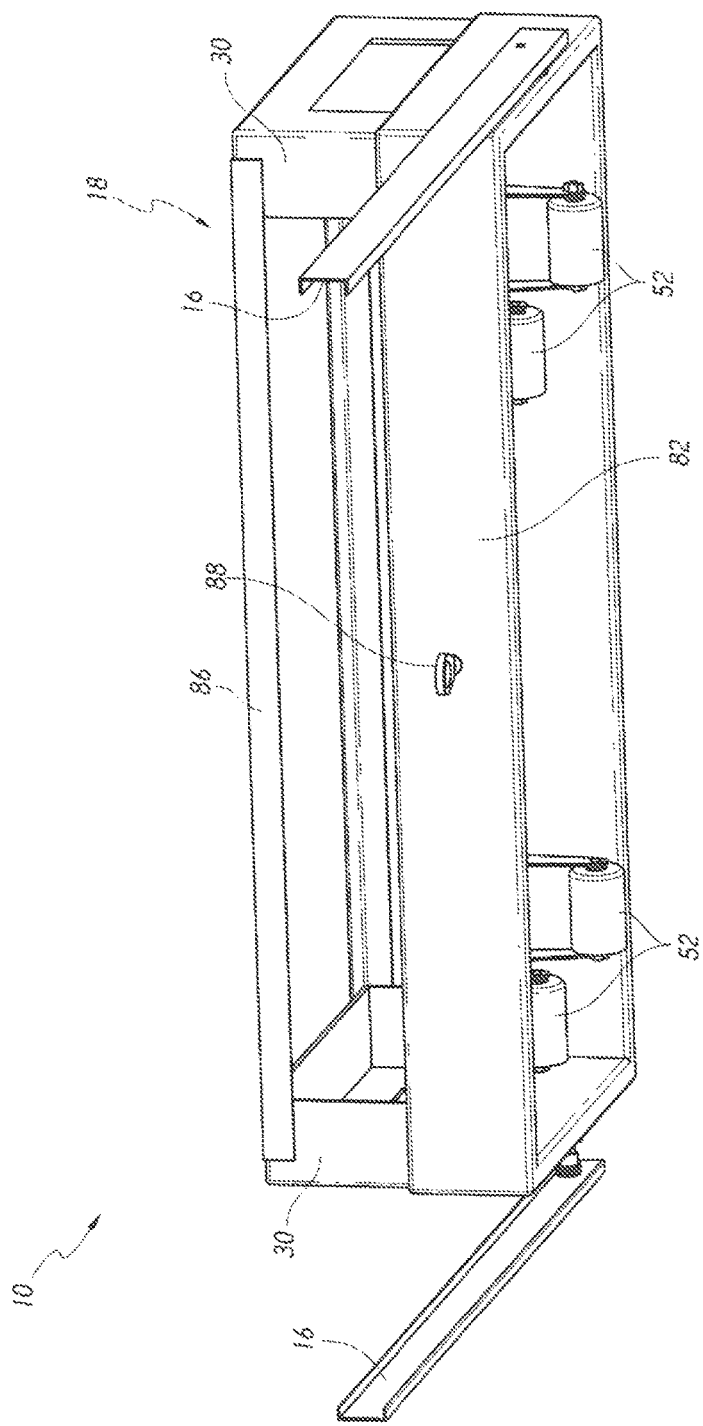
FIG. 12 is a perspective view, showing a view from beneath the present invention.

A non-motorized embodiment of movable device 10 is illustrated in FIGS. 11 and 12. In this embodiment, housing unit 18 is generally comprised of upper members 30, main body 82, rollers 52 and loop 88. Housing unit 18 is mounted to tracks as illustrated in FIG. 12. As described above, housing unit 18 can engage with tracks 16 by any known method. Loop 88 is attached directly to main body 82. Pull 90 can engage with loop 88, such that housing unit 18 can be manually moved along tracks. The reader will appreciate that loop 88 and pull 90 can be any type of temporary engagement mechanism that is capable of allowing the user to manually manipulate the position of housing unit 18 on tracks 16. Rollers 52 extend beyond the lower profile of main body 82 and are preferably wider than the width of the furrows in the typical corrugated truck bed. It is in this manner that the housing unit 18 can travel smoothly along the bed of the truck.

Figure 13:
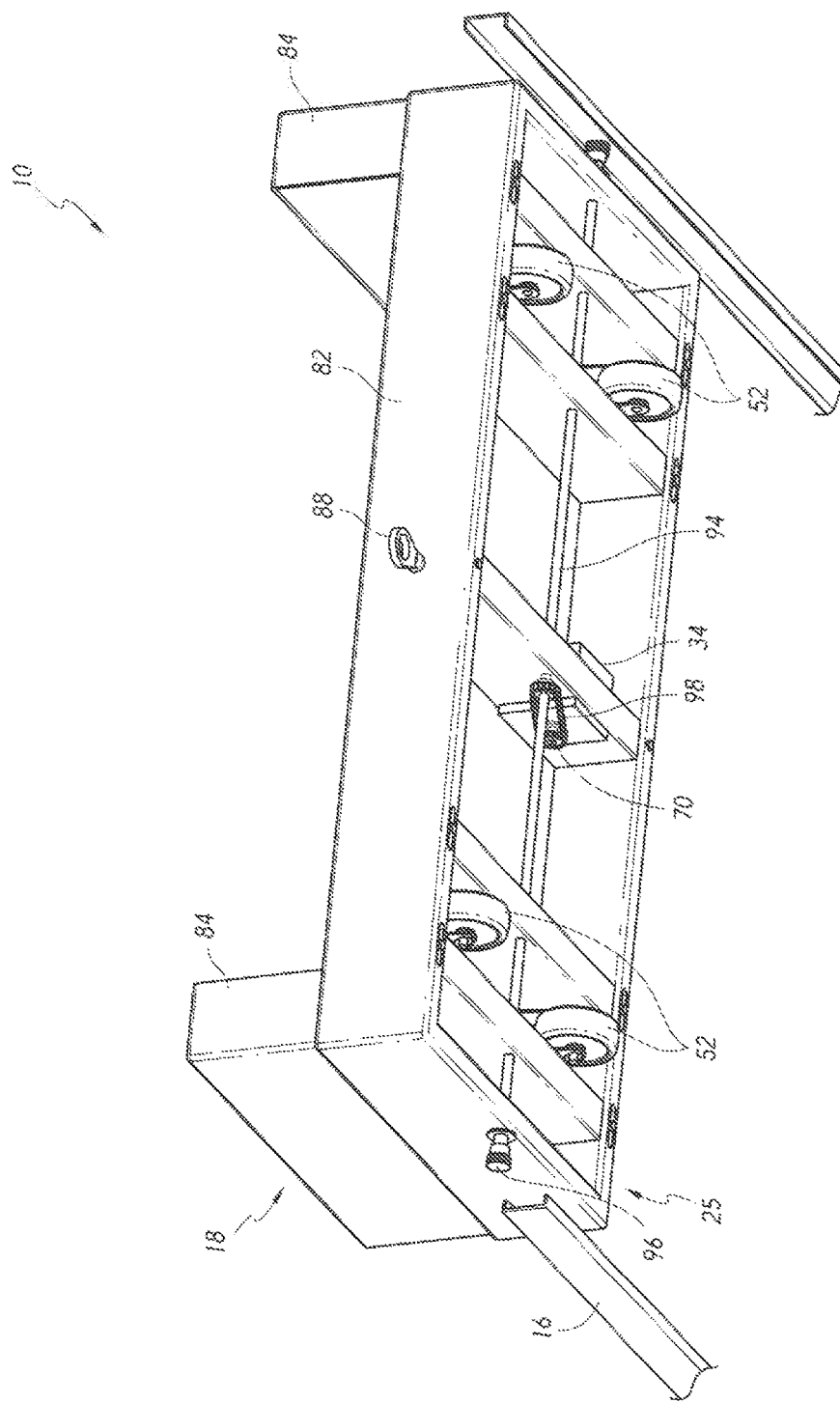
FIG. 13 is a perspective view, showing the track mounting system and the housing unit of the present invention.
Figure 14:
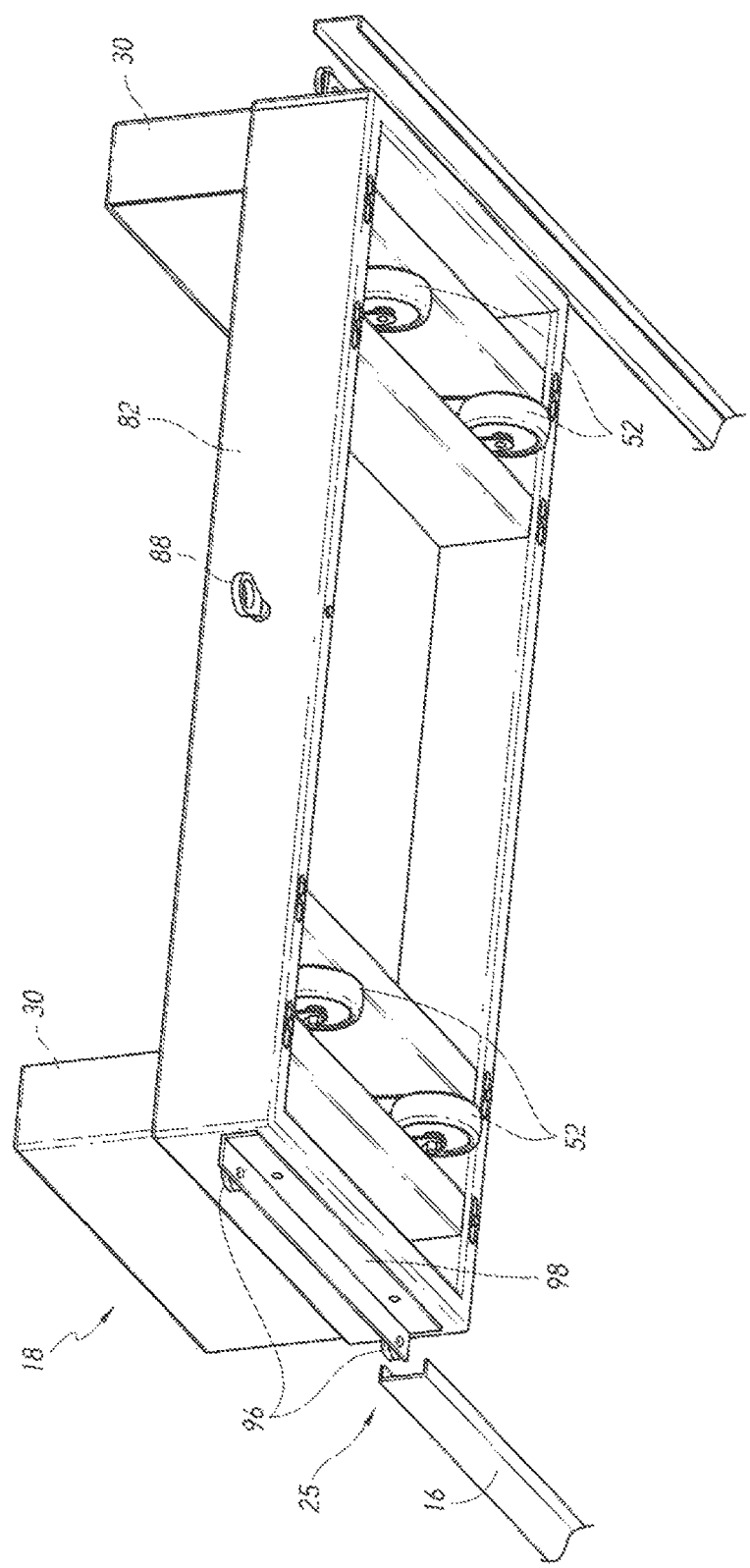
FIG. 14 is a perspective view, showing the track mounting system and the housing unit of the present invention.

FIG. 13 illustrates an alternate embodiment of movable device 10. Housing unit 18 is comprised of main body 82, upper members 30, rollers 52, motor 34, gear 70, belt 98 and shaft 94. Tracks are attached to the sidewalls of truck bed or the truck bed itself. Housing unit 18 engages with tracks 16. Again, housing unit 18 can engage with tracks 16 by any known engagement method. In the present embodiment, outer rollers 96 are fixed to a shaft 94 that runs the length of the main body 82. Belt 98 transmits power from motor 34 to shaft 94, which drives the outer roller 96 along tracks 16. Rollers 52 allow housing unit 18 to move smoothly across the bed of the truck. FIG. 14 illustrates another embodiment of track mounting system 25. In this embodiment, track mounting system 25 is comprised of tracks 16, side beam 100 and outer rollers 96. Side beams 100 are attached to main body 82 of housing unit 18. Outer rollers 96 are attached to side beams 100 such that outer rollers 96 are capable of engaging with tracks 16. Tracks 16, mounted to the side wall of truck bed, allow housing unit 18 to move linearly along length of truck bed. The reader will appreciate that the embodiment shown in FIG. 14 could be manually driven by including a loop 88 and pull 90 (shown in FIG. 11) or motorized by including a motor 34 (shown in FIG. 13) within main body 82 to drive housing unit 18.

Figure 15:
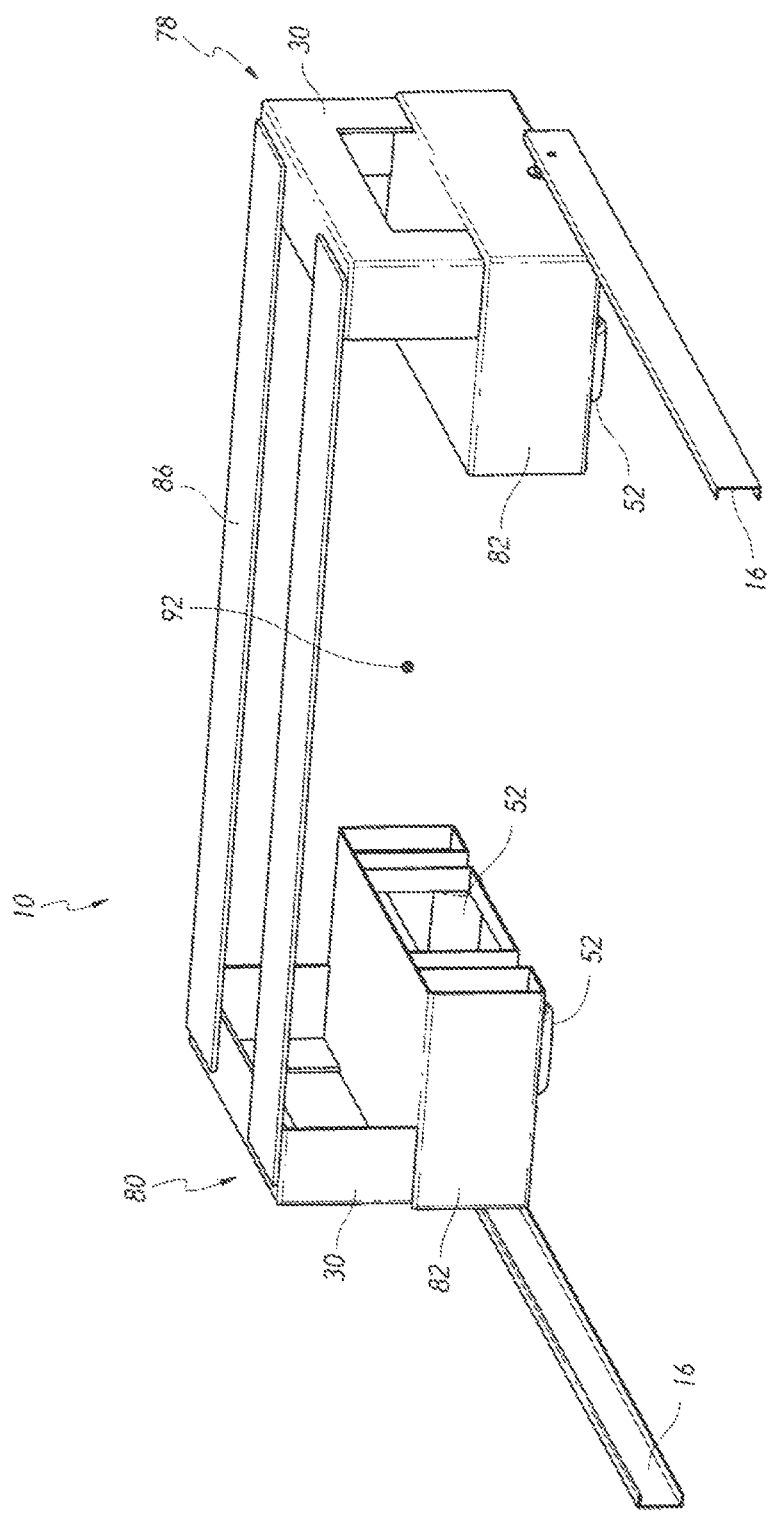
FIG. 15 is a perspective view, showing one embodiment of the present invention.

FIGS. 15-18 illustrate an alternate embodiment of the present invention that is generally comprised of first housing unit 78 and second housing unit 80 attached together by cross member 86. In FIG. 15, void 92 is shown as the space between first housing unit 78 and second housing unit 80 and below cross member 86. First housing unit 78 and second housing unit 80 each include main body 82 and upper member 30. Each unit also includes rollers within main body 82 used to assist housing units 78, 80 traveling across the length of the bed of the truck. Each unit 78, 80 is also engaged with tracks 16 as described previously in the sole housing unit embodiments. FIG. 16 illustrates a close up view of first housing unit 78. Although first housing unit 78 is illustrated, second housing unit 80 is identical. Rollers 52 are attached to main body 82 such that rollers 52 extend beyond the lower profile of main body 82. As described herein, rollers 52 are preferably wider than the furrows of the typically corrugated truck bed. A tool box (object 22) is attached to cross member 86 in FIGS. 17 and 18. As illustrated in FIG. 18, two separate housing units 78, 80 allow movable device 10 to operate without impacting items 42 in bed of truck and allows a user to use the full length of the truck bed. As an example, long items 42 are illustrated in truck bed 12 in FIG. 18. As first housing unit 78 and second housing unit 80 move towards the rear of truck 19, items 42 are not affected. As shown, upper members 30 of housing units 78, 80 allow tool box (object 22) to be mounted above the profile of the wheel wells of truck bed 12.

The preceding description contains significant detail regarding the novel aspects of the present invention. It should not be construed, however, as limiting the scope of the invention, but rather as providing illustrations of the preferred embodiments of the invention. Thus, the scope of the invention should be fixed by the following claims, rather than by examples given.

Having described my invention, I claim:

1. A movable device for mounting an object for use in a truck bed having a length, wherein said truck bed includes at least one item, said movable device comprising:
   at least one housing unit, having a main body and at least two inverted U-shaped upper members,
   wherein said at least two upper members extending upward from said main body,
   wherein said at least two upper members have at least one arm and a top member,
   at least one roller attached to said at least one housing unit,
   a track mounting system attached to said housing unit,
   at least one linear track attached to said truck bed,
   wherein said track mounting system is capable of interlocking with said at least one linear track such that said at least one housing unit linearly traverses said length of said truck bed, and
   wherein said main body is capable of directly contacting said at least one item and moving said at least one item linearly along said length of said truck bed.

2. The movable device of claim 1, wherein said top member of said at least two upper members has a flat upward facing surface that is capable of bearing weight.

3. The movable device of claim 2, further comprising a cross member connected between said at least two upper members of said at least one housing unit.

4. The movable device of claim 2, wherein said object is connected to said at least two upper members of said at least one housing unit.

5. The movable device of claim 3, wherein said object is connected to said cross member.

6. The movable device of claim 1, wherein said at least one housing unit includes a motor.

7. The movable device of claim 1, wherein said at least one housing unit has a loop, such that said movable device can be pulled linearly along said length of said truck bed using a pull.

8. The movable device of claim 1, wherein said at least one housing unit has a guard.

9. A movable device for mounting an object for use in a truck bed having a length, wherein said truck bed includes at least one item, said movable device comprising:
   a first housing unit, having a main body and an inverted U-shaped upper member, wherein said upper member has at least one arm connected to a top member having a flat upward facing surface, a second housing unit having a main body and an inverted U-shaped upper member, wherein said upper member has at least one arm connected to a top member having a flat upward facing surface, at least one roller attached to said first housing unit, at least one roller attached to said second housing unit, a track mounting system attached to said first and second housing unit, at least one linear track attached to said truck bed, and wherein said track mounting system is capable of interlocking with said at least one linear track such that said first housing unit and said second housing unit linearly traverses said length of said truck bed together.

10. The movable device of claim 9, wherein said first housing unit has a main body and an upper member and said second housing unit has a main body and an upper member.

11. The movable device of claim 10, wherein said upper member of said first housing unit and said upper member of said second housing unit are connected by a cross member, wherein said cross member is raised upward away from the surface of said main body of said first and second housing unit.

12. The movable device of claim 10, wherein said object is connected to said upper member of said first housing unit and said upper member of said second housing unit.

13. The movable device of claim 11, wherein said object is connected to said cross member.

14. The movable device of claim 9, wherein said first housing unit includes a motor.

15. The movable device of claim 9, further comprising a void formed between said first housing unit and said second housing unit such that said first housing unit and said second housing unit are capable of bypassing said at least one item in said truck bed while moving linearly along said length of said truck bed.

16. The movable device of claim 11, wherein said cross member includes a grip, such that said movable device can be pulled linearly along said length of said truck bed using a pull.

17. The movable device of claim 9, wherein said first housing unit includes a grip, such that said movable device can be pulled linearly along said length of said truck bed using a pull.

18. The movable device of claim 9, wherein said object is a toolbox.

19. A movable device for mounting an object for use in a truck bed having a length, wherein said truck bed includes at least one item, said movable device comprising:

a first housing unit, having a main body and an upper member, wherein said upper member has a first arm and a second arm connected together by a top member having a flat upward facing surface, a second housing unit, having a main body and an upper member, wherein said upper member has a first arm and a second arm connected together by a top member having a flat upward facing surface, wherein said first arm and said second arm of said upper member of said first and second housing unit extends upward away from said main body of said first and second housing unit, wherein said top member of said first and second housing unit is capable of adjusting vertically with respect to said main body of said first and second housing unit, at least one roller attached to said first housing unit, at least one roller attached to said second housing unit, a track mounting system attached to said first housing unit and said second housing unit, at least one linear track attached to said truck bed, wherein said track mounting system is capable of interlocking with said at least one linear track, and a motor, capable of driving said movable device to linearly traverse said length of said truck bed.

* * * * *